(12) United States Patent
Matsumura

(10) Patent No.: US 9,890,232 B2
(45) Date of Patent: Feb. 13, 2018

(54) RESIN COMPOSITION FOR FORMING RECORDING LAYER, RECORDING MEDIUM, AND IMAGE-RECORDED MATERIAL

(71) Applicant: FUJI XEROX CO., LTD., Tokyo (JP)

(72) Inventor: Yasuo Matsumura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 480 days.

(21) Appl. No.: 14/278,681

(22) Filed: May 15, 2014

(65) Prior Publication Data

US 2015/0168857 A1    Jun. 18, 2015

(30) Foreign Application Priority Data

Dec. 13, 2013 (JP) ................. 2013-258588

(51) Int. Cl.
```
G03G 7/00       (2006.01)
C08F 212/08     (2006.01)
C09D 4/00       (2006.01)
C08F 220/18     (2006.01)
```
(52) U.S. Cl.
CPC ........... *C08F 212/08* (2013.01); *G03G 7/004* (2013.01); *G03G 7/0026* (2013.01); *G03G 7/0046* (2013.01); *C08F 2220/1825* (2013.01); *C09D 4/00* (2013.01); *Y10T 428/2486* (2015.01); *Y10T 428/264* (2015.01)

(58) Field of Classification Search
CPC .... G03G 7/0026; G03G 7/0046; G03G 7/004; C08F 212/08; C08F 220/06
See application file for complete search history.

(56) References Cited

U.S. PATENT DOCUMENTS

| | | | |
|---|---|---|---|
| 2007/0202277 A1 | 8/2007 | Arai et al. | |
| 2009/0226834 A1 | 9/2009 | Matsumura | |
| 2010/0233604 A1* | 9/2010 | Maehata | G03G 9/0804 430/105 |
| 2011/0171572 A1* | 7/2011 | Matsumura | G03G 9/08788 430/108.4 |
| 2013/0011171 A1* | 1/2013 | Tamura | G03G 15/2021 399/321 |

FOREIGN PATENT DOCUMENTS

| | | |
|---|---|---|
| CN | 101154058 A | 4/2008 |
| JP | I-103-132397 A | 6/1991 |
| JP | I-103-178498 A | 8/1991 |
| JP | h107-28268 A | 1/1995 |
| JP | 2000-086979 A | 3/2000 |
| JP | 2003-322994 A | 11/2003 |
| JP | 2004-138997 A | 5/2004 |
| JP | 2004-163676 A | 6/2004 |
| JP | 2005-025007 A | 1/2005 |
| JP | 2005-148138 A | 6/2005 |
| JP | 2005-181883 A | 7/2005 |
| JP | 2006-091203 A | 4/2006 |
| JP | 2006-171517 A | 6/2006 |
| JP | 2007-229987 A | 9/2007 |
| JP | 2009-244857 A | 10/2009 |
| JP | 2009244354 A | 10/2009 |
| JP | 2010-145440 A | 7/2010 |
| JP | 2010-175734 A | 8/2010 |
| JP | 2010-260333 A | 11/2010 |
| JP | 2011-145333 A | 7/2011 |
| JP | 2011-145516 A | 7/2011 |
| JP | 2012-203067 A | 10/2012 |
| JP | 2013-025207 A | 2/2013 |

OTHER PUBLICATIONS

Tani et al., CAPLUS AN 2004:391644, abstracting JP 2004138997 (2004).*
Tani et al., electonic translation of JP 2004138997 (2004).*
Hiraoka et al., electronic translation of JP 2011145516 (2011).*
Nov. 29, 2016 Office Action issued in Japanese Patent Application No. 2013-258588.
Jul. 31, 2017 Office Action issued in Chinese Patent Application No. 201410324707.8.

* cited by examiner

Primary Examiner — Jeffrey Mullis
(74) Attorney, Agent, or Firm — Oliff PLC

(57) ABSTRACT

A resin composition for forming a recording layer, includes a resin and satisfies the following Expression (1):

$$20° C. \leq T_1 - T_{10} \leq 120° C.,\quad \text{Expression (1):}$$

wherein $T_1$ represents a temperature at which the viscosity of a solid sample of the resin prepared from the resin composition, measured using a flow tester, is $10^4$ Pa·s under an applied pressure of 1 MPa, and $T_{10}$ represents a temperature at which the viscosity of a solid sample of the resin prepared from the resin composition, measured using a flow tester, is $10^4$ Pa·s under an applied pressure of 10 MPa.

10 Claims, 1 Drawing Sheet

RESIN COMPOSITION FOR FORMING RECORDING LAYER, RECORDING MEDIUM, AND IMAGE-RECORDED MATERIAL

CROSS-REFERENCE TO RELATED APPLICATIONS

This application is based on and claims priority under 35 USC 119 from Japanese Patent Application No. 2013-258588 filed Dec. 13, 2013.

BACKGROUND

1. Technical Field

The present invention relates to a resin composition for forming a recording layer, a recording medium, and an image-recorded material.

2. Related Art

In electrophotographic image forming apparatuses, thermal fixing energy and the magnitude of power consumption therefore are major factors in restricting the installation environment and the usage environment of the image forming apparatuses, as well as the environmental load.

SUMMARY

According to an aspect of the invention, there is provided a resin composition for forming a recording layer, which includes a resin and satisfies the following Expression (1):

$$20° \text{C.} \leq T_1 - T_{10} \leq 120° \text{C.}, \quad \text{Expression(1):}$$

wherein $T_1$ represents a temperature at which the viscosity of a solid sample of the resin prepared from the resin composition, measured using a flow tester, is $10^4$ Pa·s under an applied pressure of 1 MPa, and $T_{10}$ represents a temperature at which the viscosity of a solid sample of the resin prepared from the resin composition, measured using a flow tester, is $10^4$ Pa·s under an applied pressure of 10 MPa.

BRIEF DESCRIPTION OF THE DRAWINGS

Exemplary embodiments of the present invention will be described in detail based on the following figures, wherein.

DETAILED DESCRIPTION

Figure 1:
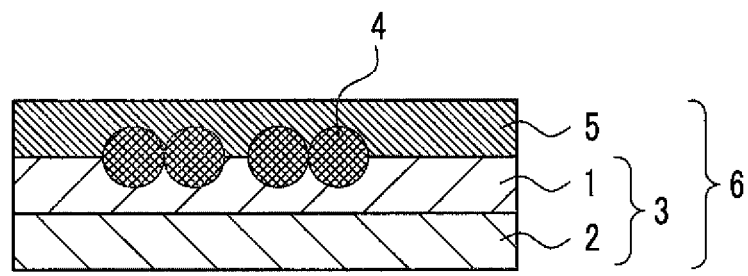
FIG. 1 is a cross-sectional view showing an example of an image-recorded material according to an exemplary embodiment.

Hereinafter, exemplary embodiments of the invention will be described in detail.

Resin Composition

A resin composition for forming a recording layer of a recording medium according to an exemplary embodiment includes a resin and satisfies the following Expression (1).

$$20° \text{C.} \leq T_1 - T_{10} \leq 120° \text{C.} \quad \text{Expression (1):}$$

In Expression (1), $T_1$ represents a temperature at which the viscosity of a solid sample of the resin prepared from the resin composition, measured using a flow tester, is $10^4$ Pa·s under an applied pressure of 1 MPa. $T_{10}$ represents a temperature at which the viscosity of a solid sample of the resin prepared from the resin composition, measured using a flow tester, is $10^4$ Pa·s under an applied pressure of 10 MPa.

By virtue of the above-described configuration, the resin composition for forming a recording layer of a recording medium according to this exemplary embodiment (hereinafter, may be referred to as "resin composition") provides a resin composition for forming a recording layer of a recording medium on which a toner image may be fixed under low pressure (for example, from 0.2 MPa to 2 MPa). The mechanism thereof is not clear, but is presumed as follows.

When the resin composition according to this exemplary embodiment satisfies the above-described configuration, the recording layer formed using the resin composition according to this exemplary embodiment exhibits a plasticizing behavior with respect to the pressure even in a non-heated state, and exhibits fluidity in a room-temperature region (for example, from 10° C. to 40° C.) even in a state in which a relatively low pressure (for example, from 0.2 MPa to 2 MPa) is applied thereto. Therefore, as for the recording layer formed using the resin composition according to this exemplary embodiment, a toner image transferred onto a surface of the recording layer of the recording medium may be fixed even when the pressure applied to the recording medium in the image formation is relatively low and no heat is applied.

In addition to this, when the resin composition according to this exemplary embodiment satisfies the above-described configuration, the recording layer does not exhibit fluidity in a state in which no pressure is applied. That is, it is difficult for the recording layer to exhibit fluidity in a step other than a fixing step in which the pressure is applied. Therefore, the recording medium provided with the recording layer is presumed to be able to be continuously transported with few occurrence of jamming of recording mediums, sticking of recording mediums to each other, sticking of recording mediums to a member of an image forming apparatus, and the like, that occur due to the fluidity of the recording layer of the recording medium in paper transporting steps such as paper feeding, transport, and paper ejection.

Furthermore, the recording layer formed using the resin composition according to this exemplary embodiment fixes a toner image with a pressure. Therefore, in an image forming method in which the recording medium provided with the recording layer is applied, there is no need to provide a thermal fixing step, and miniaturization of an image forming apparatus and a reduction in power consumption are possible.

Hereinafter, the resin composition according to this exemplary embodiment will be described in detail.

The resin composition according to this exemplary embodiment includes at least a resin. Different kinds of resins may be included, and if necessary, other additives may be included.

Examples of the resin composition according to this exemplary embodiment include solids, powders, and solutions containing one kind of resin; solids (aggregates, coalesced products), powders, and solutions containing plural kinds of resins; and liquid compositions in which one or more kinds of resins are dissolved or dispersed in a solvent.

The resin composition according to this exemplary embodiment includes a resin and satisfies the following Expression (1).

$$20° C. \leq T_1 - T_{10} \leq 120° C. \quad \text{Expression (1):}$$

In Expression (1), $T_1$ represents a temperature at which the viscosity of a solid sample of the resin prepared from the resin composition, measured using a flow tester, is $10^4$ Pa·s under an applied pressure of 1 MPa. $T_{10}$ represents a temperature at which the viscosity of a solid sample of the resin prepared from the resin composition, measured using a flow tester, is $10^4$ Pa·s under an applied pressure of 10 MPa.

A temperature difference $\Delta T(T_1-T_{10})$ is from 20° C. to 120° C., preferably from 40° C. to 100° C., and more preferably from 60° C. to 80° C. When the temperature difference $\Delta T$ is less than 20° C., a toner image is not sufficiently embedded in the recording layer of the recording medium, and thus sufficient fixability may not be obtained. When the temperature difference $\Delta T$ is greater than 120° C., the recording layer becomes too soft and the entire toner image may be embedded in the recording layer. In addition, a recording medium may stick to another recording medium or a member of an image forming apparatus and the usage in the electrophotographic process may thus become difficult.

The temperature difference $\Delta T$ is calculated using the following method. The calculation is performed using a method using a flow tester (for example, a Shimadzu flow tester CFT-500, manufactured by Shimadzu Corporation). When the resin composition is a dispersion, the dispersion is evaporated and dried to prepare a solid sample (pellet-shaped sample) of the resin. In addition, when the resin composition is a powder or a solid, the powder or solid is compressed and solidified to prepare a pellet-shaped sample. The prepared sample is set in the flow tester and slowly heated (at a rate of temperature rise of +1° C./min) from 50° C. in a measurement temperature range of from 50° C. to 150° C. to measure the viscosity of the sample under a condition where a certain extrusion pressure is applied. The applied pressure is fixed at 1 MPa and the viscosity according to the temperature at 1 MPa is measured. From the obtained viscosity graph, a temperature $T_1$ at which the viscosity is $10^4$ Pa·s under an applied pressure of 1 MPa is determined. $T_{10}$ is determined in the same manner as in the case of $T_1$, except that the applied pressure is changed from 1 MPa to 10 MPa. A difference is obtained based on the obtained $T_1$ and $T_{10}$, and the temperature difference $\Delta T(T_1-T_{10})$ is calculated.

Hereinafter, two preferable forms of the resin composition according to this exemplary embodiment will be described.

First Exemplary Embodiment

The resin composition according to this exemplary embodiment preferably includes at least two kinds of resins having different glass transition temperatures from the viewpoint of easily exhibiting a plasticizing behavior when the resin composition is formed into a film and a pressure is applied. When the resin composition according to this exemplary embodiment includes the above-described at least two kinds of resins, a phase separation structure is easily formed in the recording layer formed using the resin composition. Therefore, it is thought that a toner image is easily fixed under low pressure to the recording layer.

When the resin composition according to this exemplary embodiment includes three or more kinds of resins, glass transition temperatures of at least two of the three or more kinds of resins may be different from each other.

In the resin composition according to this exemplary embodiment, the difference between the glass transition temperatures of the two kinds of resins is preferably 30° C. or greater, and more preferably 35° C. or greater. When the difference between the glass transition temperatures of the two kinds of resins is 30° C. or greater, a toner image is easily fixed under low pressure to the recording medium having the recording layer formed using the resin composition including the two kinds of resins.

The resin composition according to this exemplary embodiment may include three or more kinds of resins, and in that case, two of the three or more kinds of resins preferably have the above-described relationship.

The content of a resin having a high glass transition temperature among the two kinds of resins may be from 5% by weight to 70% by weight, preferably from 10% by weight to 60% by weight, and more preferably from 20% by weight to 50% by weight with respect to the total weight of the two kinds of resins. When the content of the resin having a high glass transition temperature is from 5% by weight to 70% by weight, fixing under low pressure is easily performed, and thus the degree of image fixing is difficult to deteriorate.

When the resin composition according to this exemplary embodiment includes three or more kinds of resins, the content of the two kinds of resins may be from 80% by weight to 99% by weight, preferably from 85% by weight to 99% by weight, and more preferably from 90% by weight to 99% by weight with respect to the total weight of the three or more kinds of resins. When the content of the two kinds of resins is from 80% by weight to 99% by weight, the above-described fixing under low pressure is easily performed.

The glass transition temperature of at least one of the two kinds of resins having different glass transition temperatures is preferably from 40° C. or higher, more preferably 45° C. or higher, and even more preferably 50° C. or higher. When the glass transition temperature is 40° C. or higher, a recording layer of a recording medium having excellent storageability is easily formed.

The content of the resin having a glass transition temperature of 40° C. or higher may be from 5% by weight to 70% by weight, preferably from 10% by weight to 60% by weight, and even more preferably from 20% by weight to 50% by weight with respect to the weight of the two kinds of resins having different glass transition temperatures.

The glass transition temperature of a resin having a higher glass transition temperature than that of the other of the two kinds of resins may be 40° C. or higher, preferably from 40° C. to lower than 60° C., and more preferably from 40° C. to lower than 55° C. When the temperature is lower than 60° C., a fixing behavior due to the pressure at room temperature (an internal temperature of a printer is 50° C. or lower) is easily exhibited.

The glass transition temperature of a resin having a lower glass transition temperature than that of the other of the two kinds of resins may be lower than 10° C., preferably from −100° C. to lower than 10° C., and more preferably from −80° C. to lower than 10° C. When the temperature is lower than 10° C., fixing under low pressure is easily performed.

The resin composition according to this exemplary embodiment may include three or more kinds of resins. In that case, two of the three or more kinds of resins have such a relationship that the difference between the glass transition temperatures thereof is 30° C. or higher, and the glass transition temperature of at least one of the foregoing two is preferably 40° C. or higher.

The above-described aspect regarding "two kinds of resins having different glass transition temperatures" may be applied to an aspect regarding "two kinds of resins having different melting temperatures" and an aspect regarding "an amorphous resin and a crystalline resin having different glass transition temperatures and melting temperatures".

The glass transition temperature may be controlled with the density of a rigid unit such as an aromatic ring or a cyclohexane ring in a main chain of the resin. That is, the higher the density of a methylene group, an ethylene group, an oxyethylene group, or the like in the main chain, the lower the glass transition temperature, and the greater the amount of an aromatic ring, a cyclohexane ring, or the like, the higher the glass transition temperature. Furthermore, when the density of aliphatic side chains and the like is increased, the glass transition temperature is decreased. In consideration of the foregoing facts, resins having various glass transition temperatures may be obtained.

The melting temperature may also be controlled in the same manner with the density of the rigid units.

Hereinafter, when the two kinds of resins are two kinds of amorphous resins having different glass transition temperatures, a resin having a higher glass transition temperature will be referred to as "high Tg resin" and the other having a lower glass transition temperature will be referred to as "low Tg resin" when describing them.

When the two kinds of resins are two kinds of crystalline resins having different melting temperatures, a resin having a higher melting temperature will be referred to as "high melting temperature resin" and the other having a lower melting temperature will be referred to as "low melting temperature resin" when describing them.

When the two kinds of resins are an amorphous resin and a crystalline resin and they have different glass transition temperature and melting temperature and the glass transition temperature of the amorphous resin is higher than the melting temperature of the crystalline resin, the resins will be referred to as "high Tg resin" or "low melting temperature resin", and when the glass transition temperature of the amorphous resin is lower than the melting temperature of the crystalline resin, the resins will be referred to as "low Tg resin" or "high melting temperature resin".

As an aspect in which the resin composition according to this exemplary embodiment includes a high Tg resin and a low Tg resin, an aspect in which a phase separation structure may be formed to easily exhibit a plasticizing behavior when the resin composition is formed into a film and a pressure is applied is preferable. Examples of the aspect include a mixture including both of a high Tg resin and a low Tg resin; resin particles or a composition containing the resin particles in which a high Tg resin and a low Tg resin form a sea-island structure; and resin particles or a composition containing the resin particles in which a high Tg resin and a low Tg resin form a core/shell structure.

An aspect in which the resin composition according to this exemplary embodiment includes a high melting temperature resin and a low melting temperature resin, an aspect in which the resin composition according to this exemplary embodiment includes a high Tg resin and a low melting temperature resin, and an aspect in which the resin composition according to this exemplary embodiment includes a low Tg resin and a high melting temperature resin are the same as the above-described aspect in which the resin composition according to this exemplary embodiment includes a high Tg resin and a low Tg resin, except that the kinds of the resins are changed.

Hereinafter, the aspect in which the resin composition according to this exemplary embodiment includes a high Tg resin and a low Tg resin will be described in more detail as an example.

Examples of the mixture including both of a high Tg resin and a low Tg resin include, in the case in which the resin composition is a dispersion, a resin particle dispersion obtained by mixing a resin particle dispersion in which high Tg resin particles are dispersed and a resin particle dispersion in which low Tg resin particles are dispersed; in the case in which the resin composition is a powder, a powder obtained by mixing a powder including the high Tg resin and a powder including the low Tg resin; and in the case in which the resin composition is a solid, a solid obtained by melting and mixing a solid including the high Tg resin and a solid including the low Tg resin.

The resin particles in which the high Tg resin and the low Tg resin form a sea-island structure form a phase separation structure in which an island phase exists in a sea phase. In the resin particles forming the sea-island structure, the high Tg resin may form a sea phase and the low Tg resin may form an island phase, or the high Tg resin may form an island phase and the low Tg resin may form a sea phase. However, it is preferable that the high Tg resin form a sea phase and the low Tg resin form an island phase.

The sea-island structure of the resin particles contained in the resin composition is confirmed using the following method. Resin particles are buried in an epoxy resin, and then a slice is prepared using a diamond knife. The prepared slice is dyed using osmium tetroxide in a desiccator, and the dyed slice is observed using a transmission electron microscope to confirm the structure of the resin particles. Here, the sea phase and the island phase of the sea-island structure are distinguished by shades caused due to the degree of dyeing of the resin with osmium tetroxide.

The major axis of the island phase is preferably 150 nm or less. When the high Tg resin forms a sea phase and the low Tg resin forms an island phase, the low Tg resin phase as an island phase is preferably finely distributed. In that case, the diameter of the island phase is preferably 150 nm or less, more preferably from 5 nm to 150 nm, even more preferably from 50 nm to 140 nm, and especially preferably from 100 nm to 130 nm. When the diameter of the island phase is 150 nm or less, a sufficient pressure plasticizing behavior is easily exhibited, and thus a toner image is easily fixed upon pressure fixing. When the diameter of the island phase is 5 nm or greater, the high Tg resin and the low Tg resin easily form a good sea-island structure without being mixed and dissolved, and thus caking (blocking) occurring due to plasticization even at room temperature under no pressure is difficult to occur.

The major axis of the island phase may be calculated using the following method. The resin particles are buried in an epoxy resin, and then a slice is prepared using a diamond knife. The obtained slice is observed using a transmission electron microscope. The major axis of the island phase may be calculated by arbitrarily selecting 100 island phases out of the island phases observed in the slice and by then calculating an average major axis by the use of a Luzex image analyzer.

The ratio of the weight of the resin forming the island phase to the weight of the resin forming the sea phase is preferably 0.25 or greater.

In order to exhibit an appropriate pressure plasticizing behavior, for example, when the high Tg resin forms a sea phase and the low Tg resin forms an island phase, the weight ratio of the low Tg resin is preferably 0.3 or greater, more preferably 0.4 or greater, and even more preferably 0.5 or greater with respect to the weight of the high Tg resin.

In addition, the weight ratio of the low Tg resin is preferably less than 1.5 with respect to the weight of the high Tg resin. When the weight ratio of the low Tg resin is less than 1.5, plasticization at room temperature is difficult to occur.

The resin that may be used for forming a sea-island structure is preferably, for example, an addition polymerization-type resin or a polycondensation resin.

The resin particles in which a high Tg resin and a low Tg resin form a core/shell structure are resin particles having cores (core particles) and coating layers (shell layers) coating the cores.

The high Tg resin may form a core and the low Tg resin may form a coating layer, or the high Tg resin may form a coating layer and the low Tg resin may form a core. However, it is preferable that the high Tg resin form a coating layer and the low Tg resin form a core.

The diameter of the core is preferably from 10 nm to 200 nm, and more preferably from 20 nm to 150 nm. The thickness of the coating layer is preferably from 10 nm to 100 nm, and more preferably from 20 nm to 80 nm.

The core/shell structure is confirmed using the following method. The resin particles are buried in an epoxy resin, and then a slice is prepared using a diamond knife. The obtained slice is observed using a transmission electron microscope to confirm the structure of the resin particles.

The resin that may be used for forming a core/shell structure is preferably, for example, an addition polymerization-type resin or a polycondensation resin.

Second Exemplary Embodiment

The resin composition according to this exemplary embodiment preferably includes a resin having two glass transition temperatures in one molecule from the viewpoint of easily exhibiting a plasticizing behavior when the resin composition is formed into a film and a pressure is applied. When the resin composition according to this exemplary embodiment includes the resin, a phase separation structure is easily formed in the recording layer formed using the resin composition. Therefore, it is thought that a toner image is easily fixed under low pressure to the recording layer.

As for the resin having two glass transition temperatures in one molecule, a difference between the two glass transition temperatures is preferably 30° C. or greater, and more preferably 50° C. or greater from the viewpoint of easily fixing a toner to the recording layer under lower pressure.

When the resin has two glass transition temperatures in one molecule, the resin is preferably a block copolymer or a graft copolymer of resins having different glass transition temperatures. In this case, a segment derived from a resin having a higher glass transition temperature will be referred to as "high Tg segment" and a segment derived from the other resin having a lower glass transition temperature will be referred to as "low Tg segment".

The ratio of the high Tg segment in the resin is preferably from 5% by weight to 70% by weight, and more preferably from 10% by weight to 60% by weight. When the ratio of the high Tg segment is from 5% by weight to 70% by weight, fixing under low pressure is easily performed, and thus the degree of image fixing is difficult to deteriorate.

The glass transition temperature of the resin is preferably 40° C. or higher, more preferably 45° C. or higher, and even more preferably 50° C. or higher. When the glass transition temperature is 40° C. or higher, a recording layer of a recording medium having excellent storageability is easily formed.

As long as a plasticizing behavior is exhibited under applied pressure, the block copolymer may have any linking form between the constituent segments.

Examples of the block copolymer include, when the high Tg segment is represented by A and the low Tg segment is represented by B, AB-type, ABA-type, BAB-type, $(AB)_n$-type, $(AB)_nA$-type, and $B(AB)_n$-type block copolymers.

As for the phase separation structure formed of the block copolymer, the thermodynamically most stable structure exists according to the kind and the molecular weight of the constituent segment. In general, in the case of a copolymer composed of a segment C and a segment D, the structure does not depend on the linking form, but depends only on a composition ratio of C to D, and with an increase in the ratio of C to D, it is systematically changed to a structure in which C is a spherical domain and D is a matrix (sphere C-matrix D) (sea-island), a structure in which C is a rod-shaped domain and D is a matrix (cylinder), a structure in which C and D are cavities (gyroid), a C/D alternating layer structure (lamella), a structure in which D is a rod-shaped domain and C is a matrix (cylinder), a structure in which D and C are cavities (gyroid), and a structure in which D is a spherical domain and C is a matrix (sphere D-matrix C) (sea-island).

However, when the film formation is performed using a wet application method, the phase separation state may be arbitrarily controlled by a solvent to be used, a drying rate, and the like. For example, even when the ratio of C to D is large and sphere D-matrix C is taken thermodynamically, a sphere C-matrix D structure may be obtained when a solvent that is a good solvent to D and is a poor solvent to C is selected as a solvent to be applied.

In addition, when a good solvent to both of C and D is used and rapidly removed, a phase separation structure (modulated structure) freezed in a spinodal decomposition state may be obtained. In addition, when a polymer that is compatible only with D is added to a copolymer in which the ratio of C to D is large and sphere D-matrix C is taken thermodynamically, a phase separation structure in which C is a sphere and D and the polymer that is compatible only with D are a matrix may be obtained.

The size of a repeating unit of the phase separation structure formed of the block copolymer increases with an increase in the molecular weight of the block copolymer. The weight average molecular weight of the block copolymer may be from 3,000 to 500,000, preferably from 5,000 to 400,000, and more preferably from 6,000 to 300,000.

The sphere C-matrix D and the sphere D-matrix C represent resin particles or a composition containing the resin particles in which a block copolymer having a high Tg segment and a low Tg segment forms a sea-island structure. The sea-island structure is the same as the above-described sea-island structure formed of a high Tg resin and a low Tg resin.

The block copolymer or the graft copolymer having a high Tg segment and a low Tg segment may take an aspect of resin particles forming a core/shell structure. The core/shell structure is the same as the above-described core/shell structure formed of a high Tg resin and a low Tg resin.

In addition, a method of manufacturing resin particles in which the block copolymer or the graft polymer forms a core/shell structure is, for example, a method of manufacturing the resin particles by preparing aggregated particles as cores through an emulsion aggregating method and by then forming shell layers on surfaces of the aggregated particles by polymerizing monomers.

As a method of synthesizing the block copolymer or the graft copolymer, an arbitrary appropriate synthesis method may be used, which is described in literatures such as "4-th edition, Jikken Kagaku Koza 28, polymer synthesis (Maruzen, 1992)", "Chemistry and Industry of Macromonomer (I.P.C, 1990)", "Compatibilization of Polymer and Evaluation Technology (Technical Information Institute, Co., Ltd., 1992), "New Polymeric Material One Point 12, polymer alloy (Kyoritsu, 1988)", "Angew. Macromol. Chem., 143, pp. 1 to 9 (1986)", "The Adhesion Society of Japan, 26, pp. 112 to 118 (1990)", "Macromolecules, 28, pp. 4893 to 4898 (1995)", "J. Am. Chem. Soc., 111, pp. 7641 to 7643 (1989)", and "JP-A-6-83077".

The resin that is used for synthesis of the block copolymer or the graft copolymer is preferably, for example, an addition polymerization-type resin or a polycondensation resin.

Temperature Characteristics of Resin

The "crystalline" resin indicates one having not a stepwise change in the amount of heat absorbed, but a clear endothermic peak in the differential scanning calorimetry. Specifically, it indicates that the half value width of an endothermic peak measured at a rate of temperature rise of 10 (° C./min) is within 10° C. The "amorphous" resin indicates one having a half value width of an endothermic peak exceeding 10° C., exhibiting a stepwise change in the amount of heat absorbed, or having no clear endothermic peak.

The glass transition temperature of the resin is obtained from a DSC curve obtained by differential scanning calorimetry (DSC). More specifically, the glass transition temperature is obtained from "extrapolated glass transition onset temperature" described in the method of obtaining a glass transition temperature in JIS K7121-1987 "testing methods for transition temperatures of plastics". In addition, the melting temperature of the resin is obtained from "melting peak temperature" described in the method of obtaining a melting temperature in JIS K7121-1987 "testing methods for transition temperatures of plastics", from a DSC curve obtained by differential scanning calorimetry (DSC).

Hereinafter, the measurement of the glass transition temperature of a resin composition including a high Tg resin and a low Tg resin will be described as an example for each aspect of the resin composition.

When the resin composition is a mixture including both of a high Tg resin and a low Tg resin, the glass transition temperatures of the high Tg resin and the low Tg resin before mixing are measured.

When the resin composition contains resin particles in which a high Tg resin and a low Tg resin form a sea-island structure, the glass transition temperatures of the high Tg resin and the low Tg resin before the preparation of the resin particles forming the sea-island structure are measured.

When the resin composition contains resin particles in which a high Tg resin and a low Tg resin form a core/shell structure and the resin particles are prepared through an emulsion aggregating method, the glass transition temperatures of the high Tg resin and the low Tg resin before the preparation of the resin particles are measured.

The method of measuring the melting temperature of a resin composition including a high melting temperature resin and a low melting temperature resin is the same as the method of measuring the glass transition temperature of a resin composition including a high Tg resin and a low Tg resin, except that the glass transition temperature is changed to the melting temperature. The method of measuring the glass transition temperature and the melting temperature of a resin composition having a combination with another resin, such as a resin composition including a high Tg resin and a low melting temperature resin, is also the same as the above-described measurement method.

When the resin composition includes a block copolymer or a graft copolymer having a high Tg segment and a low Tg segment, the block copolymer or the graft copolymer in the resin composition is subjected to DSC measurement to determine, from an obtained DSC curve, a glass transition temperature derived from the high Tg segment and a glass transition temperature derived from the low Tg segment in a molecule of the block copolymer or the graft copolymer.

The method of measuring the glass transition temperature or the melting temperature of a resin composition including a block copolymer or a graft copolymer of another aspect is also the same as above.

Resin

The resin will be described.

Examples of the resin include an addition polymerization-type resin and a polycondensation resin.

The addition polymerization-type resin is a polymer of monomers having ethylenically unsaturated double bonds.

Examples of the monomer (a monomer having ethylenically unsaturated double bonds) constituting the addition polymerization-type resin include styrenes such as styrene, parachlorostyrene, and α-methylstyrene; (meth)acrylates such as methyl acrylate, ethyl acrylate, propyl acrylate, butyl acrylate, lauryl acrylate, 2-ethylhexyl acrylate, methyl methacrylate, ethyl methacrylate, propyl methacrylate, butyl methacrylate, hexyl methacrylate, lauryl methacrylate, and 2-ethylhexyl methacrylate; (meth)acrylonitriles such as acrylonitrile and methacrylonitrile; ethylenically unsaturated carboxylic acids such as acrylic acid, methacrylic acid, and crotonic acid; vinyl ethers such as vinyl methyl ether and vinyl isobutyl ether; vinyl ketones such as vinyl methyl ketone, vinyl ethyl ketone, and vinyl isopropenyl ketone; olefins such as isoprene, butene, and butadiene; and β-carboxyethyl acrylate. A homopolymer obtained by polymerizing one of these monomers, a copolymer obtained by copolymerizing two or more of these monomers, or a mixture thereof may be used.

If necessary, the addition polymerization-type resin may contain an acidic polar group, a basic polar group, or an alcoholic hydroxy group. Examples of the acidic polar group include a carboxyl group, a sulfonic acid group, and an acid anhydride.

Examples of the monomer for providing an acidic polar group in the addition polymerization-type resin include an α,β-ethylenically unsaturated compound having a carboxyl group or a sulfonic acid group. Specific examples thereof preferably include acrylic acid, methacrylic acid, fumaric acid, maleic acid, itaconic acid, cinnamic acid, sulfonated styrene, and allylsulfosuccinic acid.

Examples of the basic polar group include amino group, amide group, and hydrazide group.

Examples of the monomer for providing a basic polar group in the addition polymerization-type resin include a monomer having a nitrogen atom (hereinafter, sometimes referred to as "nitrogen-containing monomer"). Examples of the nitrogen-containing monomer preferably include a (meth)acrylic amide compound, a (meth)acrylic hydrazide compound, and an aminoalkyl(meth)acrylate compound.

Here, the expressions such as "(meth)acrylate" are abbreviated expressions indicating that both structures of methacrylate and acrylate may be taken, and have the same usage below.

Examples of the (meth)acrylic amide compound include acrylic amide, methacrylic amide, acrylic methylamide, methacrylic methylamide, acrylic dimethylamide, acrylic diethylamide, acrylic phenylamide, and acrylic benzylamide.

Examples of the (meth)acrylic hydrazide compound include acrylic hydrazide, methacrylic hydrazide, acrylic methylhydrazide, methacrylic methylhydrazide, acrylic dimethylhydrazide, and acrylic phenylhydrazide.

The aminoalkyl(meth)acrylate compound may be a monoalkylaminoalkyl(meth)acrylate compound or a dialkylaminoalkyl(meth)acrylate compound. Examples of the aminoalkyl(meth)acrylate compound include 2-aminoethyl acrylate, 2-aminoethyl methacrylate, and 2-(diethylamino)ethyl(meth)acrylate.

Examples of the monomer for forming an alcoholic hydroxy group preferably include hydroxy(meth)acrylates, and specific examples thereof include 2-hydroxyethyl(meth)acrylate, hydroxypropyl(meth)acrylate, and hydroxybutyl (meth)acrylate.

A chain transfer agent may be used in the polymerization of the addition polymerization-type resin.

The chain transfer agent is not particularly limited, but for example, a compound having a thiol component may be used. Examples of the compound having a thiol component include mercaptan. Specific examples thereof preferably include alkylmercaptans such as hexylmercaptan, heptylmercaptan, octylmercaptan, nonylmercaptan, decylmercaptan, and dodecylmercaptan.

A crosslinking agent may be added to the addition polymerization-type resin to form a crosslinked resin. Examples of the crosslinking agent include a polyfunctional monomer having two or more ethylenically unsaturated groups in a molecule.

Examples of the polyfunctional monomer include aromatic polyvinyl compounds such as divinylbenzene and divinylnaphthalene; polyvinyl esters of aromatic polyvalent carboxylic acid, such as divinyl phthalate, divinyl isophthalate, divinyl terephthalate, divinyl homophthalate, divinyl/trivinyl trimesate, divinyl naphthalenedicarboxylate, and divinyl biphenylcarboxylate; divinyl esters of nitrogen-containing aromatic compound, such as divinyl pyridinedicarboxylate; vinyl esters of unsaturated heterocyclic compound carboxylic acid, such as vinyl pyromucate, vinyl furancarboxylate, vinyl pyrrole-2-carboxylate, and vinyl thiophenecarboxylate; (meth)acrylic acid esters of linear polyol, such as butanediol methacrylate, hexanediol acrylate, octanediol methacrylate, decanediol acrylate, and dodecanediol methacrylate; (meth)acrylic acid esters of branched, substituted polyol, such as neopentyl glycol dimethacrylate and 2-hydroxy-1,3-diacryloxypropane; polyethylene glycol di(meth) acrylate; polypropylene polyethylene glycol di(meth)acrylates; and polyvinyl esters of polyvalent carboxylic acid, such as divinyl succinate, divinyl fumarate, vinyl/divinyl maleate, divinyl diglycolate, vinyl/divinyl itaconate, divinyl acetonedicarboxylate, divinyl glutarate, divinyl 3,3'-thiodipropionate, divinyl/trivinyl trans-aconitate, divinyl adipate, divinyl pimelate, divinyl suberate, divinyl azelate, divinyl sebacate, divinyl dodecanedioic acid, and divinyl brassylate. These crosslinking agents may be used alone or in combination of two or more kinds thereof.

Among the crosslinking agents, (meth)acrylic acid esters of linear polyol, such as butanediol methacrylate, hexanediol acrylate, octanediol methacrylate, decanediol acrylate, and dodecanediol methacrylate; (meth)acrylic acid esters of branched, substituted polyol, such as neopentyl glycol dimethacrylate and 2-hydroxy-1,3-diacryloxypropane; polyethylene glycol di(meth)acrylate; polypropylene polyethylene glycol di(meth)acrylates, and the like are preferably used.

The content of the crosslinking agent is preferably from 0.05% by weight to 5% by weight, and more preferably from 0.1% by weight to 1.0% by weight, based on the total amount of the monomers constituting the addition polymerization-type resin.

The addition polymerization-type resin may be manufactured through radical polymerization using a radical polymerization initiator. The radical polymerization initiator is not particularly limited, and a known radical polymerization initiator may be used.

The amount of the radical polymerization initiator used is preferably from 0.01% by weight to 15% by weight, and more preferably from 0.1% by weight to 10% by weight, based on the total amount of the monomers constituting the addition polymerization-type resin.

The weight average molecular weight of the addition polymerization-type resin is preferably from 1,500 to 60,000, and more preferably from 3,000 to 40,000.

The weight average molecular weight (Mw) and the number average molecular weight (Mn) are measured by gel permeation chromatography (GPC). The molecular weight measurement by GPC is performed using HLC-8120 GPC, which is GPC manufactured by Tosoh Corporation as a measuring device, TSK gel Super HM-M (15 cm), which is column manufactured by Tosoh Corporation, and a THF solvent. The weight average molecular weight and the number average molecular weight are calculated using a molecular weight calibration curve plotted from a monodisperse polystyrene standard sample from the results of the foregoing measurement.

Examples of the polycondensation resin include a polyester resin. The polyester resin may be crystalline or amorphous.

Examples of the monomer constituting the polyester resin include a polyvalent carboxylic acid containing two or more carboxyl groups in one molecule, a polyol containing two or more hydroxyl groups in one molecule, and a hydroxy carboxylic acid.

Examples of the dicarboxylic acid among the polyvalent carboxylic acids used to obtain a crystalline polyester resin include oxalic acid, glutaric acid, succinic acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-carboxylic acid, malic acid, citric acid, hexahydroterephthalic acid, malonic acid, pimelic acid, tartaric acid, mucic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediglycolic acid, p-phenylenediglycolic acid, o-phenylenediglycolic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid, and 1,4-cyclohexanedicarboxylic acid. These dicarboxylic acids may be used alone or in combination of two or more kinds thereof.

Examples of the polyvalent carboxylic acids other than the dicarboxylic acid include trimellitic acid, pyromellitic acid, naphthalenetricarboxylic acid, naphthalenetetracarboxylic acid, pyrenetricarboxylic acid, and pyrenetetracarboxylic acid.

Also, those where the carboxy group of these carboxylic acids is subjected to derivatization to obtain an acid anhydride, a mixed acid anhydride, an acid chloride, an ester or the like may be used. The polyvalent carboxylic acids other than the dicarboxylic acid may be used alone or in combination of two or more kinds thereof. These polyvalent carboxylic acids may be used alone or in combination of two or more kinds thereof.

Examples of the polyol used to obtain a crystalline polyester resin include ethylene glycol, diethylene glycol, triethylene glycol, 1,2-propylene glycol, 1,3-propylene glycol, 1,4-butanediol, 1,4-butenediol, neopentyl glycol, 1,5-pentane glycol, 1,6-hexane glycol, 1,4-cyclohexanediol, 1,4-cyclohexanedimethanol, dipropylene glycol, polyethylene glycol, polypropylene glycol, polytetramethylene glycol, bisphenol A, bisphenol Z, hydrogenated bisphenol A, cyclohexanedimethanol, and alkylene oxide adducts of these alcohols. These polyols may be used alone or in combination of two or more kinds thereof.

A desired crystalline polyester resin is obtained by combination and polycondensation of the polyvalent carboxylic acid and the polyol.

Examples of the crystalline polyester resin include a polyester resin obtained by polycondensation of 1,9-nonanediol and 1,10-decanedicarboxylic acid, a polyester resin obtained by polycondensation of cyclohexanediol and adipic acid, a polyester resin obtained by polycondensation of 1,6-hexanediol and sebacic acid, a polyester resin obtained by polycondensation of ethylene glycol and succinic acid, a polyester resin obtained by polycondensation of ethylene glycol and sebacic acid, and a polyester resin obtained by polycondensation of 1,4-butanediol and succinic acid.

In addition, one kind out of the polyvalent carboxylic acids and one kind out of the polyols may be used, one kind out of either the polyvalent carboxylic acids or the polyols and two or more kinds out of the other may be used, or two or more kinds of the polyvalent carboxylic acids and two or more kinds out of the polyols may be used. When a hydroxycarboxylic acid is used as a monomer, one or two or more kinds of hydroxycarboxylic acids may be used. The hydroxycarboxylic acid may also be used in combination with a polyvalent carboxylic acid or a polyol.

Examples of the dicarboxylic acid among the polyvalent carboxylic acids used to obtain an amorphous polyester resin include phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediglycolic acid, p-phenylenediglycolic acid, o-phenylenediglycolic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid, and cyclohexanedicarboxylic acid.

Examples of the polyvalent carboxylic acids other than the dicarboxylic acid include trimellitic acid, pyromellitic acid, naphthalenetricarboxylic acid, naphthalenetetracarboxylic acid, pyrenetricarboxylic acid, and pyrenetetracarboxylic acid. Also, those where the carboxy group of these carboxylic acids is subjected to derivatization to obtain an acid anhydride, an acid chloride, an ester or the like may be used. These polyvalent carboxylic acids may be used alone or in combination of two or more kinds thereof.

Among these, preferably used are terephthalic acid or a lower ester thereof, diphenylacetic acid, and 1,4-cyclohexanedicarboxylic acid. A lower ester indicates an ester of an aliphatic alcohol having from 1 to 8 carbon atoms.

Examples of the polyol used to obtain an amorphous polyester resin include the above-described polyols. Among the polyols, particularly, polytetramethylene glycol, bisphenol A, bisphenol Z, hydrogenated bisphenol A, cyclohexanedimethanol, and alkylene oxide adducts of these alcohols are preferably used. These polyols may be used alone or in combination of two or more kinds thereof.

An amorphous resin or a crystalline resin may be easily obtained by combination of the polycondensable monomers.

In order to prepare one kind of polycondensation resin, one kind out of the polyvalent carboxylic acids and one kind out of the polyols may be used, one kind out of either the polyvalent carboxylic acids or the polyols and two or more kinds out of the other may be used, or two or more kinds of the polyvalent carboxylic acids and two or more kinds out of the polyols may be used. When a hydroxycarboxylic acid is used to prepare one kind of polycondensation resin, one or two or more kinds of hydroxycarboxylic acids may be used. The hydroxycarboxylic acid may also be used in combination with a polyvalent carboxylic acid or a polyol.

The weight average molecular weight of the polycondensation resin is preferably from 1,500 to 60,000, and more preferably from 3,000 to 40,000. When the weight average molecular weight is less than 1,500, cracks easily occur in a folded part or the like of a recording layer and peeling from a base material layer also easily occurs. In addition, the resin may be partially branched or crosslinked by, for example, selecting the carboxylic acid valence or alcohol valence of monomers.

Additives

Examples of other additives include a surfactant, a catalyst, and a solvent.

Method of Manufacturing Resin Composition

Examples of the method of manufacturing the resin composition according to this exemplary embodiment include a method of synthesizing a resin in a water solvent through an emulsification and polymerization method using a known surfactant to prepare a resin particle dispersion. After the preparation of the resin particle dispersion, a different resin particle dispersion may be mixed therewith to obtain a resin particle dispersion in which different kinds of resin particles are dispersed.

Hereinafter, the method of manufacturing a resin composition having such an aspect that a high Tg resin and a low Tg resin are included will be described in detail as an example. An aspect in which a high melting temperature resin and a low melting temperature resin are included, an aspect in which a high Tg resin and a low melting temperature resin are included, and an aspect in which a low Tg resin and a high melting temperature resin are included are the same as the aspect in which a high Tg resin and a low Tg resin are included, except that the kinds of the resins are changed.

Method of Manufacturing Mixture Including Both of High Tg Resin and Low Tg Resin Examples of the method of manufacturing a mixture including both of a high Tg resin and a low Tg resin include, in the case in which the resin composition is a dispersion, a method of mixing a resin particle dispersion in which high Tg resin particles are dispersed and a resin particle dispersion in which low Tg resin particles are dispersed; in the case in which the resin composition is a powder, a method of mixing a powder having a high Tg resin and a powder having a low Tg resin; in the case in which the resin composition is a solid, a method of melting and mixing a solid having a high Tg resin and a solid having a low Tg resin.

Method of Manufacturing Resin Particles Forming Sea-Island Structure

Resin particles in which a high Tg resin and a low Tg resin form a sea-island structure may be formed as aggregated and coalesced particles through a general emulsion aggregating method using, for example, a resin particle dispersion in which high Tg resin particles are dispersed and a resin particle dispersion in which low Tg resin particles are dispersed.

In that case, the resin particles of each of the high Tg resin and the low Tg resin may have a median diameter of at most 100 nm or less as a resin particle dispersion of the raw material. The median diameter is preferably from 10 nm to 90 nm, and more preferably from 40 nm to 80 nm. When the median diameter of the resin particles of each of the high Tg resin and the low Tg resin is 100 nm or less, the major axis of an island phase included in the aggregated and coalesced particles is 150 nm or less, and thus a toner image has improved fixability. When the median diameter of the resin particles of each of the high Tg resin and the low Tg resin is 10 nm or greater, the sea-island structure is easily formed with little progress of mixing and dissolution upon aggregation and coalescence and plasticization at room temperature is difficult to occur. Examples of the method of adjusting the median diameter of the resin particles include a method of adjusting the amount of a surfactant that is used upon emulsification and dispersion of the resin of the raw material.

The median diameter of the resin particles may be measured using a known method. For example, it may be measured using a laser diffraction-type particle size distribution measuring device (manufactured by Horiba, Ltd., LA-920).

Method of Manufacturing Resin Particles Having Core/Shell Structure

Resin particles having a core/shell structure may be manufactured through, for example, an emulsion aggregating method. In this case, the resin particles having a core/shell structure are manufactured through the above-described steps (resin particle dispersion preparation step, aggregated particle forming step, and coalescence step), a step of mixing the dispersion in which the aggregated particles are dispersed with a second resin particle dispersion to perform aggregation so that the resin particles further adhere to surfaces of the aggregated particles, thereby forming second aggregated particles, and a step of coalescing the second aggregated particles to form resin particles having a core/shell structure.

Recording Medium

A recording medium according to this exemplary embodiment has a base material and a recording layer formed on the base material using a resin composition. Since the recording medium according to this exemplary embodiment has a recording layer formed using the resin composition according to this exemplary embodiment, a toner image may be fixed under low pressure.

Examples of the base material include paper.

Examples of the paper include fine paper, coating paper, kraft paper, glassine paper, and recycled paper.

The recording layer is a layer for fixing a toner image.

The thickness of the recording layer may be from 1 m to 50 μm, preferably from 2 μm to 30 μm, and more preferably from 3 μm to 25 μm.

The recording layer preferably has a phase separation structure which easily exhibits a plasticizing behavior when a pressure is applied to the recording layer. Examples of the phase separation structure include a sea-island structure, an aggregated structure of a core/shell structure, and a structure including at least any of a block copolymer and a graft copolymer.

The recording layer preferably has such an aspect that at least two kinds of resins or a resin having two kinds of segments is/are included and a phase separation structure is provided. The recording layer more preferably has a phase separation structure including a high Tg resin and a low Tg resin or a phase separation structure including a resin having a high Tg segment and a low Tg segment. Examples of the phase separation structure include aggregated and coalesced resin particles in which a high Tg resin and a low Tg resin form a sea-island structure, aggregated and coalesced resin particles in which a high Tg resin and a low Tg resin form a core/shell structure, and a structure including a block copolymer or a graft copolymer having a high Tg segment and a low Tg segment.

Hereinafter, the aspect in which a phase separation structure including a high Tg resin and a low Tg resin is provided will be described as an example of the aspects of the recording layer. An aspect in which a high melting temperature resin and a low melting temperature resin are included, an aspect in which a high Tg resin and a low melting temperature resin are included, and an aspect in which a low Tg resin and a high melting temperature resin are included are the same as the aspect in which a high Tg resin and a low Tg resin are included, except that the kinds of the resins are changed.

The aggregated and coalesced resin particles in which a high Tg resin and a low Tg resin form a sea-island structure forms a phase separation structure in which an island phase exists in a sea phase. In the aggregated and coalesced particles, the high Tg resin may form a sea phase and the low Tg resin may form an island phase, or the high Tg resin may form an island phase and the low Tg resin may form a sea phase. However, it is preferable that the high Tg resin form a sea phase and the low Tg resin form an island phase.

The sea-island structure of the aggregated and coalesced particles is confirmed using the following method. A recording layer of a recording medium according to this exemplary embodiment is buried in an epoxy resin, and then a slice is prepared using a diamond knife. The prepared slice is dyed using osmium tetroxide in a desiccator, and the dyed slice is observed using a transmission electron microscope to confirm the structure of the recording layer. Here, the sea phase and the island phase of the sea-island structure are distinguished by shades caused due to the degree of dyeing of the resin with osmium tetroxide.

The major axis of the island phase is preferably 150 nm or less. When the high Tg resin forms a sea phase and the low Tg resin forms an island phase, the low Tg resin phase as an island phase is preferably finely distributed. In that case, the diameter of the island phase is preferably 150 nm or less, more preferably from 5 nm to 150 nm, even more preferably from 50 nm to 140 nm, and especially preferably from 100 nm to 130 nm. When the diameter of the island phase is 150 nm or less, a sufficient pressure plasticizing behavior is easily exhibited, and thus a toner image is easily fixed upon pressure fixing. When the diameter of the island phase is 5 nm or greater, the high Tg resin and the low Tg resin easily form a good sea-island structure without being mixed and dissolved, and thus caking (blocking) occurring due to plasticization even at room temperature under no pressure is difficult to occur.

The major axis of the island phase may be calculated using the following method. The recording layer is buried in an epoxy resin, and then a slice is prepared using a diamond knife. The obtained slice is observed using a transmission electron microscope. The major axis of the island phase may be calculated by arbitrarily selecting 100 island phases out of the island phases observed in the slice and by then calculating an average major axis by the use of a Luzex image analyzer.

The ratio of the weight of the resin forming the island phase to the weight of the resin forming the sea phase is preferably 0.25 or greater.

In order to exhibit an appropriate pressure plasticizing behavior, for example, when the high Tg resin forms a sea phase and the low Tg resin forms an island phase, the weight ratio of the low Tg resin is preferably 0.3 or greater, more preferably 0.4 or greater, and even more preferably 0.5 or greater with respect to the weight of the high Tg resin.

In addition, the weight ratio of the low Tg resin is preferably less than 1.5 with respect to the weight of the high Tg resin. When the weight ratio of the low Tg resin is less than 1.5, plasticization at room temperature is difficult to occur.

The aggregated and coalesced resin particles in which a high Tg resin and a low Tg resin form a core/shell structure are aggregated and coalesced resin particles having cores (core particles) and coating layers (shell layers) coated on the cores. A preferable aspect of the core and the coating layer is the same as that of the resin particles in the resin composition for forming a recording layer.

The core/shell structure is confirmed using the following method. The recording layer is buried in an epoxy resin, and then a slice of the resin composition is prepared using a diamond knife. The obtained slice is observed using a transmission electron microscope to confirm the structure of the recording layer.

In the structure including a block copolymer or a graft copolymer having a high Tg segment and a low Tg segment, a preferable aspect of the block copolymer or the graft copolymer is the same as that of the polymer in the resin composition for forming a recording layer.

Examples of the method of manufacturing the recording medium according to this exemplary embodiment include, in the case in which the resin composition is a dispersion, a forming method including preparing a resin particle dispersion (the resin composition according to this exemplary embodiment) in which at least the resin is dispersed, applying the prepared resin particle dispersion to a base material, and performing drying; and in the case in which the resin composition is a powder, a method including forming a layer of a melted powder on a peelable substrate and laminating the formed layer on a base material. Here, the substrate is not particularly limited, as long as it supports the formed recording layer and the recording layer may be peeled therefrom. A known substrate may be used.

The application of the resin particle dispersion is performed using, for example, a blade coater, a roll coater, a reverse roll coater, an air knife coater, a rod coater, a cast coater, a bar coater, a curtain coater, a die slot coater, a gravure coater, or the like either on-machine or off-machine. For drying, a method of artificially promoting the drying may be employed, as well as natural drying. For example, an infrared dryer, a drum dryer, an air cap dryer, an air foil dryer, an air conveyer dryer, or the like may be used.

Image-Recorded Material

An image-recorded material according to this exemplary embodiment has a recording medium, a toner image that is formed on the recording medium using an electrostatic charge image developing toner and is fixed without being entirely embedded, and a peelable image information concealing layer that is coated on at least a part of the toner image in this order. The recording medium according to this exemplary embodiment is applied as the recording medium of the image-recorded material according to this exemplary embodiment. The image information concealing layer is a layer that may be peeled if necessary and is coated on the toner image on the recording layer of the recording medium so that the image information may not be grasped from the outside.

The expression "fixed without being entirely embedded" indicates a state in which the toner image is fixed without being entirely buried in the recording layer. The toner image may be fixed to the surface of the recording layer by adhesion, or may be fixed to the recording layer by partial embedding. Hereinafter, a further description will be given with reference to the drawings.

FIG. 1 is a cross-sectional view showing an example of the image-recorded material according to this exemplary embodiment.

An image-recorded material 6 shown in FIG. 1 has a recording medium 3, a toner image 4, and an image information concealing layer 5. The recording medium 3 has a base material 2 and a recording layer 1 formed on the base material 2. The toner image 4 is formed in the recording layer 1 of the recording medium 3 using an electrostatic charge image developing toner (hereinafter, may be referred to as "toner"), and is fixed by being embedded partially, not entirely, in the recording layer 1. The toner image (image information) 4 is coated with the image information concealing layer 5. If necessary, by peeling the image information concealing layer 5, the content of the image information may be confirmed. The toner image is preferably an isolated image or a line drawing in which superimposition of toner is difficult to occur.

The image-recorded material according to this exemplary embodiment is excellent in peelability of the image information concealing layer since the toner image is fixed without being entirely embedded. Here, the peelability represents ease of peeling of the image information concealing layer and sharpness of the toner image remaining after the peeling of the image information concealing layer.

The image information concealing layer is not particularly limited, as long as it conceals the image information to be coated so that the image information may not be grasped, and is hard so that the entire toner image is not embedded in the recording layer. Examples thereof include paper, a plastic film, and metallic foil. These may be laminated or be coated with a substance having light shieldability.

Examples of the paper include fine paper, coating paper, kraft paper, glassine paper, and recycled paper.

Examples of the plastic film include a polyester film, a polypropylene film, and a polyvinyl chloride film.

Examples of the metallic foil include aluminum foil, copper foil, silver foil, gold foil, stainless steel foil, titanium foil, and metal-deposited films thereof.

Image Forming Method

An image forming method according to this exemplary embodiment has a charging step of charging a surface of an image holding member, an electrostatic charge image forming step of forming an electrostatic charge image on a charged surface of the image holding member, a developing step of developing the electrostatic charge image formed on the surface of the image holding member with an electrostatic charge image developer including an electrostatic charge image developing toner to form a toner image, a transfer step of transferring the toner image formed on the surface of the image holding member onto a surface of a recording layer of a recording medium, and a fixing step of fixing the toner image transferred onto the surface of the recording layer of the recording medium to the recording layer of the recording medium by pressure, without entirely embedding the toner image therein.

The image forming method according to this exemplary embodiment is an image forming method in which an unfixed toner image is formed on a surface of a recording layer of a recording medium and a pressure is applied thereto to obtain a fixed toner image, and is characterized in that the recording medium according to this exemplary embodiment is used as the recording medium.

Since the image forming method according to this exemplary embodiment uses the recording medium according to this exemplary embodiment, an image forming method in which a toner image may be fixed under low pressure is provided.

As the charging step, the electrostatic charge image forming step, the developing step, and the transfer step, steps of a known electrophotographic (electrostatic charge) image forming method may be used.

The fixing step is a step of fixing the toner image transferred onto the surface of the recording layer of the recording medium to the recording layer of the recording medium by pressure, without entirely embedding the toner image therein.

The expression "fixing the toner image . . . without entirely embedding the toner image therein" indicates that the toner image transferred onto the surface of the recording layer is fixed without being entirely buried in the recording layer. The toner image may be fixed to the surface of the recording layer by adhesion, or may be fixed to the recording layer by partial embedding.

The pressure applied to the recording medium is preferably from 0.2 MPa to 2.0 MPa, and more preferably from 0.3 MPa to 1.0 MPa. When the pressure applied to the recording medium is from 0.2 MPa to 2.0 MPa, a general thermal fixing device may be used, and thus there is no influence on the weight or size of the image forming apparatus.

Figure 2:
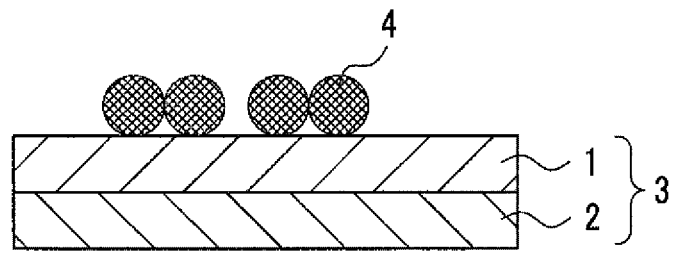
FIG. 2 is a cross-sectional view showing an example of a recording medium in which a toner image is transferred onto a surface of a recording layer.
Figure 3:
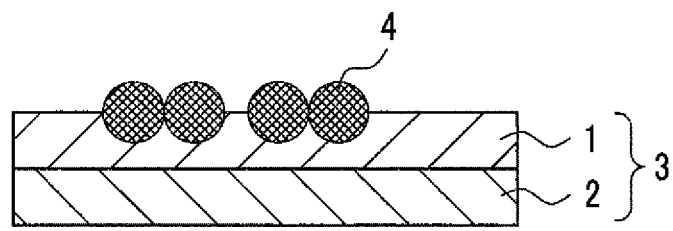
FIG. 3 is a cross-sectional view showing an example of a recording medium in which a toner image is fixed to a recording layer.

FIG. 2 is a cross-sectional view showing an example of a recording medium in which a toner image is transferred onto a surface of a recording layer of the recording medium. A state after the transfer step in the image forming method, in which the toner image 4 is placed on the surface of the recording layer 1 of the recording medium 3 according to this exemplary embodiment is shown. When subjected to the fixing step of applying a pressure to the toner image 4 and the recording layer 1 of the recording medium shown in FIG. 2, the toner image 4 transferred onto the surface of the recording layer 1 of the recording medium 3 is fixed to the recording layer 1 of the recording medium 3 by pressure, without being entirely embedded therein. The recording medium subjected to the fixing step is shown in FIG. 3.

The image forming method according to this exemplary embodiment further has a coating step of coating at least a part of the toner image fixed to the recording layer of the recording medium with a peelable image information concealing layer, and an adhesion step of allowing the image information concealing layer to adhere to the recording layer of the recording medium by pressure.

The image information concealing layer conceals at least a part of the toner image.

When the image forming method according to this exemplary embodiment has the coating step and the adhesion step, an image forming method capable of manufacturing an image-recorded material having excellent peelability may be provided.

In the image forming method according to this exemplary embodiment, the fixing step and the adhesion step may be performed at the same time. That is, in a state in which the surface of the recording layer of the recording medium onto which the toner image is transferred is coated with a peelable image information concealing layer, a pressure may be applied to the image information concealing layer to adhere the image information concealing layer to the recording layer of the recording medium while fixing the toner image to the recording layer of the recording medium without being entirely embedding the toner image therein.

Figure 4:
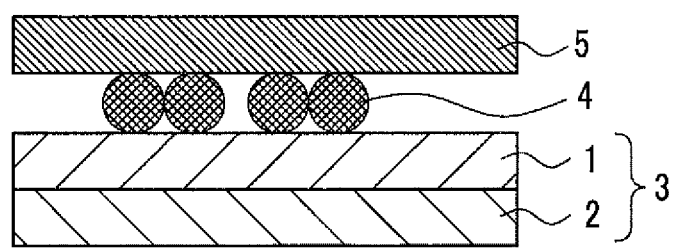
FIG. 4 is a cross-sectional view showing an example of a recording medium in which a toner image is transferred onto a surface of a recording layer of a recording medium and the toner image and the recording layer are coated with an image information concealing layer.

FIG. 4 is a cross-sectional view showing an example of a recording medium in which a toner image is transferred onto a surface of a recording layer of the recording medium and the toner image and the recording layer are coated with an image information concealing layer. A state before the fixing step and the adhesion step in the image forming method further having the coating step and the adhesion step, in which the toner image 4 is placed on the surface of the recording layer 1 of the recording medium 3 according to this exemplary embodiment, and the toner image 4 and the recording layer 1 are coated with the image information concealing layer 5 is shown. When a pressure is applied to the image information concealing layer 5, the image information concealing layer 5 adheres to the recording layer 1 while the toner image 4 is fixed to the recording layer 1 without being entirely embedded therein. The image-recorded material subjected to the fixing step and the adhesion step has the state shown in FIG. 1.

EXAMPLES

Hereinafter, this exemplary embodiment will be described in more detail using examples, but is not limited to the examples. In the following description, unless specifically noted, "parts" and "%" mean "parts by weight" and "% by weight", respectively.

Preparation of Resin Particle Dispersion

Preparation of Resin Particle Dispersion (A1)

Styrene: 300 parts n-Butyl Acrylate: 100 parts

Acrylic Acid: 8 parts

Dodecanethiol: 3 parts

The above components are mixed and dissolved to prepare a mixture. 3 parts of a nonionic surfactant Nonipol 400 (manufactured by Sanyo Chemical Industries, Ltd.) and 5 parts of an anionic surfactant Neogen SC (manufactured by Dai-Ichi Kogyo Seiyaku Co., Ltd.) are dissolved in 250 parts of ion exchange water, and the above-described mixture is added thereto, and dispersed and emulsified in a flask to prepare a monomer emulsion liquid.

Furthermore, 3 parts of Nonipol 400 and 5 parts of Neogen SC are dissolved in 300 parts of ion exchange water. While the obtained material is slowly mixed for 10 minutes, it is subjected to nitrogen substitution to prepare a surfactant aqueous solution. Thereafter, the temperature of the surfactant aqueous solution is increased to 75° C. and 50% of the monomer emulsion liquid is added dropwise to the surfactant aqueous solution to prepare a reaction liquid.

Thereafter, 4 parts of ammonium persulphate is dissolved in 50 parts of ion exchange water, and the obtained material is added to the reaction liquid. The remaining 50% of the monomer emulsion liquid is added dropwise thereto over 1 hour. Thereafter, the content in the flask is kept at 75° C. using an oil bath while stirring to continuously perform the emulsion polymerization for 4 hours.

Accordingly, an anionic resin particle dispersion (A1) having a central diameter of 200 nm, a glass transition temperature of 54° C., a weight average molecular weight Mw of 47,000, and a number average molecular weight Mn of 12,500 is obtained.

Preparation of Resin Particle Dispersion (A2)

The emulsion polymerization is performed under the same conditions as in the preparation of the resin particle dispersion (A1), except that 100 parts of styrene and 300 parts of n-butyl acrylate are used. As a result, an anionic resin particle dispersion (A2) in which resin particles having a central diameter of 200 nm, a glass transition temperature of 6° C., a weight average molecular weight Mw of 39,000, and a number average molecular weight Mn of 10,500 are dispersed is obtained.

Preparation of Resin Particle Dispersion (A3)

The emulsion polymerization is performed under the same conditions as in the preparation of the resin particle dispersion (A1), except that 320 parts of styrene and 80 parts of n-butyl acrylate are used. As a result, an anionic resin particle dispersion (A3) in which resin particles having a central diameter of 220 nm, a glass transition temperature of 57° C., a weight average molecular weight Mw of 42,000, and a number average molecular weight Mn of 13,000 are dispersed is obtained.

Preparation of Resin Particle Dispersion (A4)

The emulsion polymerization is performed under the same conditions as in the preparation of the resin particle dispersion (A1), except that 30 parts of styrene and 370 parts of n-butyl acrylate are used. As a result, an anionic resin particle dispersion (A4) in which resin particles having a central diameter of 200 nm, a glass transition temperature of −30° C., a weight average molecular weight Mw of 32,000, and a number average molecular weight Mn of 13,000 are dispersed is obtained.

Preparation of Resin Particle Dispersion (A5)

The emulsion polymerization is performed under the same conditions as in the preparation of the resin particle dispersion (A1), except that 200 parts of styrene and 200 parts of n-butyl acrylate are used. As a result, an anionic resin particle dispersion (A5) in which resin particles having a central diameter of 200 nm, a glass transition temperature of 30° C., a weight average molecular weight Mw of 37,000, and a number average molecular weight Mn of 12,000 are dispersed is obtained.

Preparation of Resin Particle Dispersion (A6)

The emulsion polymerization is performed under the same conditions as in the preparation of the resin particle dispersion (A1), except that 350 parts of styrene and 50 parts of n-butyl acrylate are used. As a result, an anionic resin particle dispersion (A6) in which resin particles having a central diameter of 210 nm, a glass transition temperature of 80° C., a weight average molecular weight Mw of 36,000, and a number average molecular weight Mn of 11,500 are dispersed is obtained.

Preparation of Resin Particle Dispersion (A7)

The emulsion polymerization is performed under the same conditions as in the preparation of the resin particle dispersion (A1), except that 50 parts of styrene and 350 parts of n-butyl acrylate are used. As a result, an anionic resin particle dispersion (A7) in which resin particles having a central diameter of 180 nm, a glass transition temperature of −35° C., a weight average molecular weight Mw of 32,000, and a number average molecular weight Mn of 9,000 are dispersed is obtained.

Preparation of Resin Particle Dispersion (A8)

The emulsion polymerization is performed under the same conditions as in the preparation of the resin particle dispersion (A1), except that 380 parts of styrene and 20 parts of n-butyl acrylate are used. As a result, an anionic resin particle dispersion (A8) in which resin particles having a central diameter of 200 nm, a glass transition temperature of 90° C., a weight average molecular weight Mw of 40,000, and a number average molecular weight Mn of 13,500 are dispersed is obtained.

Preparation of Resin Particle Dispersion (B1)

300 parts of ion exchange water and 1.5 parts of tetradecyltrimethylammonium bromide (TTAB, manufactured by Sigma-Aldrich Co. LLC.) are put into a glass flask to prepare a TTAB aqueous solution.

The prepared TTAB aqueous solution is subjected to nitrogen substitution for 20 minutes, and the temperature is increased to 65° C. while stirring. 40 parts of an n-butyl acrylate monomer is added to the TTAB aqueous solution, and stirring is further performed for 20 minutes. Then, a solution obtained by dissolving 0.5 parts of an initiator V-50 (2,2'-azobis(2-methyl propionamidine)dihydrochloride, manufactured by Wako Pure Chemical Industries, Ltd.) in 10 parts of ion exchange water is put into the flask.

The inside of the flask is kept at 65° C. for 3 hours. 50 parts of styrene, 20 parts of n-butyl acrylate, 2.5 parts of acrylic acid, and 0.8 parts of dodecanethiol are emulsified in a TTAB aqueous solution obtained by dissolving 0.5 parts of TTAB in 100 parts of ion exchange water to prepare an emulsion liquid. The prepared emulsion liquid is continuously put into the flask using a proportioning pump over two hours. The temperature in the flask is increased to 70° C. and kept for 2 hours, and the polymerization is completed.

As a result, a resin particle dispersion (B1) in which resin particles having a weight average molecular weight Mw of 22,000, a number average molecular weight Mn of 8,000, a central diameter of 170 nm, and a core (glass transition temperature: −50° C.)/shell (glass transition temperature: +50° C.) structure with a solid content of 25% are dispersed is obtained.

Preparation of Resin Particle Dispersion (C1)

1,4-Cyclohexanedicarboxylic Acid: 175 parts

1 Ethylene Oxide Adduct of Bisphenol A (2-Mol Adduct in terms of both terminals): 310 parts Dodecylbenzenesulfonic Acid: 0.5 part The above compounds are mixed and put into a reaction container provided with a stirrer, and polycondensation is performed at 100° C. for 4 hours under a nitrogen atmosphere to obtain a transparent amorphous resinous compound. The weight average molecular weight obtained by GPC is 5,000 and the glass transition temperature (onset) is 50° C.

Caprolactone: 90 parts

Dodecylbenzenesulfonic Acid: 0.2 part

The above compounds are mixed and put into a reaction container provided with a stirrer, and polycondensation is performed at 90° C. for 5 hours under a nitrogen atmosphere to obtain a transparent crystalline polyester oligomer. The weight average molecular weight obtained by GPC is 6,000, the glass transition temperature (onset) is −60° C., and the melting temperature is 60° C.

50 parts of the obtained amorphous resinous compound and 50 parts of the obtained crystalline polyester oligomer are mixed at 100° C. and heated for 2 hours in the reaction container provided with a stirrer to obtain a resin of a block copolymer. The glass transition temperature (onset) obtained by DSC as the block copolymer is 45° C. The weight average molecular weight is 11,500 and the number average molecular weight is 4,000, which are obtained by GPC.

To 100 parts of this resin, 0.5 part of soft sodium dodecylbenzenesulfonate as a surfactant is added. 300 parts of ion exchange water is further added thereto. The obtained material is mixed and dispersed using a homogenizer (manufactured by IKA-Werke GmbH & Co. KG, Ultra Turrax T50) in a glass flask while being heated at 80° C. Thereafter, the pH in the system is adjusted to 5.0 with a 0.5 mol/L sodium hydroxide aqueous solution, and then heating to 90° C. is performed while the stirring is continuously performed by the homogenizer, whereby a resin particle dispersion (C1) in which polyester resin particles of a block copolymer having a central particle diameter of 180 nm and a solid content of 20% are dispersed is obtained.

Preparation of Resin Particle Dispersion (C2)

A resin is prepared in the same manner as in the case of C1, except that 50 parts of the amorphous resinous compound and 50 parts of the crystalline polyester oligomer used in the preparation of the resin particle dispersion (C1) are changed to 30 parts of the amorphous resinous compound and 70 parts of the crystalline polyester oligomer, and a resin particle dispersion (C2) including resin particles having a central particle diameter of 180 nm is obtained. The glass transition temperature (onset) obtained by DSC is 35° C. The weight average molecular weight is 11,000 and the number average molecular weight is 3,500, which are obtained by GPC.

Example 1

Preparation of Water Dispersion

Preparation of Water Dispersion (1)

The resin particle dispersion (A1) and the resin particle dispersion (A2) are mixed at a volume ratio of 30:70 (resin particle dispersion (A1): resin particle dispersion (A2)) to obtain a water dispersion (1) of a resin composition having a solid content of 42% by weight.

The obtained water dispersion (1) is evaporated and dried to prepare a pellet-shaped sample. The prepared sample is set in a flow tester (manufactured by Shimadzu Corporation, Shimadzu flow tester CFT-500) to measure the viscosity of the resin composition under the above-described measurement conditions to thus obtain $T_1$ and $T_{10}$. A temperature difference $\Delta T(T_1-T_{10})$ is calculated from the obtained $T_1$ and $T_{10}$.

Example 2

Preparation of Water Dispersion (2)

The resin particle dispersion (A3) and the resin particle dispersion (A4) are mixed at a volume ratio of 30:70 (resin particle dispersion (A3): resin particle dispersion (A4)) to obtain a water dispersion (2) of a resin composition having a solid content of 42% by weight.

Example 3

Preparation of Water Dispersion (3)

The resin particle dispersion (B1) is prepared as a water dispersion (3) of a resin composition.

Example 4

Preparation of Water Dispersion (4)

The resin particle dispersion (C1) is prepared as a water dispersion (4) of a resin composition.

Example 5

Preparation of Water Dispersion (5)

The resin particle dispersion (A6) and the resin particle dispersion (A7) are mixed at a volume ratio of 30:70 (resin particle dispersion (A6): resin particle dispersion (A7)) to obtain a water dispersion (5) of a resin composition having a solid content of 42% by weight.

Example 6

Preparation of Water Dispersion (6)

The resin particle dispersion (A3) and the resin particle dispersion (A5) are mixed at a volume ratio of 30:70 (resin particle dispersion (A3): resin particle dispersion (A5)) to obtain a water dispersion (6) of a resin composition having a solid content of 42% by weight.

Example 7

Preparation of Water Dispersion (7)

The resin particle dispersion (A5) and the resin particle dispersion (A4) are mixed at a volume ratio of 30:70 (resin particle dispersion (A5): resin particle dispersion (A4)) to obtain a water dispersion (7) of a resin composition having a solid content of 42% by weight.

Example 8

Preparation of Water Dispersion (8)

The resin particle dispersion (C2) is prepared as a water dispersion (8) of a resin composition.

Comparative Example 1

Preparation of Water Dispersion (R1)

The resin particle dispersion (A4) is prepared as a water dispersion (R1) of a resin composition.

Comparative Example 2

Preparation of Water Dispersion (R2)

The resin particle dispersion (A3) and the resin particle dispersion (A5) are mixed at a volume ratio of 50:50 (resin particle dispersion (A3): resin particle dispersion (A5)) to obtain a water dispersion (R2) of a resin composition having a solid content of 42% by weight.

Comparative Example 3

Preparation of Water Dispersion (R3)

The resin particle dispersion (A8) and the resin particle dispersion (A7) are mixed at a volume ratio of 30:70 (resin particle dispersion (A8): resin particle dispersion (A7)) to obtain a water dispersion (R3) of a resin composition having a solid content of 42% by weight.

As in the case of the water dispersion (1) of Example 1, temperature differences $\Delta T(T_1-T_{10})$ of the water dispersions (2) to (8) and the water dispersions (R1) to (R3) are calculated. Regarding Examples 1 to 8 and Comparative Examples 1 to 3, the evaluation is performed as follows.
Evaluation
Evaluation of Fixability The above-described prepared water dispersion is applied to label paper (V860) as a base material manufactured by Fuji Xerox Co., Ltd. using a bar coater and air-dried so that a thickness after drying is 20 μm, whereby a recording medium is prepared. Using an electrophotographic image forming apparatus using a toner, a letter image is fixed to the prepared recording medium by applying a pressure to acquire the letter image by room temperature fixing (an internal temperature of the image forming apparatus is 50° C.). The image forming apparatus used is an apparatus obtained by modifying of Fuji Xerox MONO P200b. The fixing of the letter image is performed without heating of a fixing device under a condition that the maximum pressure is adjusted to 0.5 MPa.

A surface of the acquired letter image is strongly wiped with Kimwipe (registered trade mark) (manufactured by Nippon Paper Crecia Co., Ltd.). The strongly wiped letter image and the used Kimwipe are visually observed to evaluate the fixability.

The evaluation standards are as follows. Fixing grade G3 or higher grades are judged as practically usable level.
Fixing Grade
G5: There are no image defects and no toner is transferred to the Kimwipe.
G4: There are slight image defects with no influence in practical use. Slight transfer to the Kimwipe is observed.
G3: There are image defects and transfer to the Kimwipe is observed.
G2: Legible even with image defects. A large amount of toner is transferred to the Kimwipe.
G1: The image is erased, and is thus illegible. Almost all toner is transferred to the Kimwipe.
Evaluation of Peelability A recording medium is prepared in the same manner as in the case of the evaluation of the fixability. A letter image is transferred onto this recording medium using Fuji Xerox MONO 200b. Using Fuji Xerox MONO 200b, a toner solid image is thermally fixed to both surfaces of Fuji Xerox C2 paper to prepare black paper for coating. The black paper for coating overlaps on the image surface of the recording medium having the letter image transferred thereonto. The recording medium on which the black paper for coating overlaps passes through the fixing device of the image forming apparatus used in the evaluation of the fixability to fix the letter image by pressure and to allow the black paper for coating to adhere to the surface of the letter image, thereby preparing an image-recorded material by room temperature fixing (an internal temperature of the image forming apparatus is 50° C.). The fixing of the letter image and the adhesion of the black paper for coating are performed without heating of the fixing device under a condition that the maximum pressure is adjusted to 0.5 MPa.

From the image-recorded material thus prepared, the black paper for coating is peeled to evaluate the peelability with a peel force and sharpness (visually confirmed) of the letter image concealed with the black paper for coating.

The evaluation standards are as follows. Grade G3 or higher grades are judged as practically usable level.
Grade
G5: Manual peeling is possible with an appropriate peel force, and no defects are shown in both of the image and the recording medium.
G4: Manual peeling is possible with an appropriate peel force, and slight peeling is shown in the recording medium, but there is no influence on the image.
G3: Manual peeling is possible with an appropriate peel force, but small peeling and defects are shown in the recording medium or the image.
G2: A slightly large manual peel force is used, and peeling and defects are shown in the recording medium and the image.
G1: A large manual peel force is used, and considerable peeling and defects are shown in the recording medium and the image.
Structure of Resin Composition Through the above-described method, it is confirmed whether the recording layer of the recording medium has a core/shell structure or a sea-island structure.

Tables 1 and 2 show the characteristics of the resin compositions and the evaluation results as a list. In Table 1, "(entire)" indicates properties of the entire polymer, not properties of each part in the polymer. In Table 2, "- - -" indicates that the evaluation is not possible. In Table 2, "$\Delta T$" represents a difference ($T_1-T_{10}$) between $T_1$ and $T_{10}$. "$\Delta Tg$" represents a difference in the glass transition temperatures.

TABLE 1

| Resin Particle Dispersion | Central Diameter/nm | Glass Transition Temperature/° C. | Weight Average Molecular Weight (Mw) | Number Average Molecular Weight (Mn) |
|---|---|---|---|---|
| A1 | 200 | 54 | 47000 | 12500 |
| A2 | 200 | 6 | 39000 | 10500 |
| A3 | 220 | 57 | 42000 | 13000 |
| A4 | 200 | −30 | 32000 | 13000 |
| A5 | 200 | 30 | 37000 | 12000 |
| B1 | 170 | −50° C. (core particle) +50° C. (shell layer) | 22000 (entire) | 8000 |
| C1 | 180 | 45 (entire) | 11500 | 4000 |
| A6 | 210 | 80 | 36000 | 11500 |
| A7 | 180 | −35 | 32000 | 9000 |
| A8 | 200 | 90 | 40000 | 13500 |
| C2 | 180 | 35 (entire) | 11000 | 3500 |

TABLE 2

| | Resin Particle Dispersion | Water Dispersion | $T_1$/° C. | $T_{10}$/° C. | $\Delta T$/° C. | $\Delta Tg$/° C. | Evaluation Fixability | Peelability |
|---|---|---|---|---|---|---|---|---|
| Example 1 | A1 + A2 | 1 | 85 | 40 | 45 | 47.5 | G4 | G5 |
| Example 2 | A3 + A4 | 2 | 100 | 30 | 70 | 87 | G5 | G5 |
| Example 3 | B1 | 3 | 120 | 60 | 60 | 100 | G4 | G5 |
| Example 4 | C1 | 4 | 100 | 50 | 50 | 110 | G4 | G5 |
| Example 5 | A6 + A7 | 5 | 140 | 30 | 110 | 115 | G5 | G4 |
| Example 6 | A3 + A5 | 6 | 120 | 85 | 35 | 27 | G3 | G4 |
| Example 7 | A5 + A4 | 7 | 100 | 60 | 40 | 60 | G4 | G3 |
| Example 8 | C2 | 8 | 90 | 40 | 50 | 110 | G4 | G3 |
| Comparative Example 1 | A4 | R1 | 30 | 30 | 0 | 0 | — | — |
| Comparative Example 2 | A3 + A5 | R2 | 75 | 60 | 15 | 27 | G1 | G2 |
| Comparative Example 3 | A8 + A7 | R3 | 150 | 25 | 125 | 125 | G2 | G2 |

In Comparative Example 1, recording mediums adhere to each other in the image forming apparatus, whereby a recording medium for evaluation and an image-recorded material may not be prepared.

From the results shown in Table 2, it is found that in the examples, good results are obtained in the fixability evaluation and in the peelability evaluation.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image-recorded material comprising:
a recording medium comprising:
   a base material; and
   a recording layer formed over an entire top surface of the base material, the recording layer being a layer onto which a toner image can be fixed and comprising a resin composition which comprises a resin and satisfies the following Expression (1):

$$20° C. \leq T_1 - T_{10} \leq 120° C., \quad \text{Expression(1):}$$

wherein $T_1$ represents a temperature at which the viscosity of a solid sample of the resin prepared from the resin composition, measured using a flow tester, is $10^4$ Pa·s under an applied pressure of 1 MPa, and $T_{10}$ represents a temperature at which the viscosity of a solid sample of the resin prepared from the resin composition, measured using a flow tester, is $10^4$ Pa·s under an applied pressure of 10 MPa, and
the resin composition comprises at least two kinds of resins having a sea-island structure;
a toner image that is formed using an electrostatic charge image developing toner on the recording layer of the recording medium and is fixed without being entirely embedded; and
a peelable image information concealing layer that coats at least a part of the toner image, in this order.

2. The image-recorded material according to claim 1, wherein the at least two kinds of resins have different glass transition temperatures.

3. The image-recorded material to claim 2, wherein a difference between the glass transition temperatures of the two kinds of resins is 30° C. or greater.

4. The image-recorded material according to claim 2, wherein at least one of the two kinds of resins has a glass transition temperature of 40° C. or higher.

5. The image-recorded material according to claim 2, wherein the content of the two kinds of resins having different glass transition temperatures is from 5% by weight to 70% by weight with respect to the total weight of the resins.

6. The image-recorded material according to claim 2, wherein at least one of the two kinds of resins has a glass transition temperature of lower than 10° C.

7. The image-recorded material according to claim 1, wherein an island phase of the sea-island structure has a major axis of 150 nm or less.

8. The image-recorded material according to claim 1, wherein a ratio of the weight of the resin forming an island phase to the weight of the resin forming a sea phase of the sea-island structure is from 0.25 or greater.

9. The image-recorded material according to claim 1, wherein the recording layer has a thickness of from 1 μm to 50 μm.

10. An image-recorded material comprising:
a recording medium comprising:
   a base material; and
   a recording layer formed over an entire top surface of the base material, the recording layer being a layer onto which a toner image can be fixed and comprising a resin composition which comprises a resin and satisfies the following Expression (1):

$$20° C. \leq T_1 - T_{10} \leq 120° C., \quad \text{Expression(1):}$$

wherein $T_1$ represents a temperature at which the viscosity of a solid sample of the resin prepared from the resin composition, measured using a flow tester, is $10^4$ Pa·s under an applied pressure of 1 MPa, and $T_{10}$ represents a temperature at which the viscosity of a solid sample of the resin prepared from the resin composition, measured using a flow tester, is $10^4$ Pa·s under an applied pressure of 10 MPa;

a toner image that is formed using an electrostatic charge image developing toner on the recording layer of the recording medium and is fixed without being entirely embedded; and a peelable image information concealing layer that coats at least a part of the toner image, in this order.

* * * * *